United States Patent
Xu et al.

(10) Patent No.: US 12,072,938 B2
(45) Date of Patent: Aug. 27, 2024

(54) GRAPH GENERATION METHOD AND APPARATUS, DEVICE, AND STORAGE MEDIUM

(71) Applicant: Beijing Zitiao Network Technology Co., Ltd., Beijing (CN)

(72) Inventors: Yuan Xu, Beijing (CN); Ruifeng Ma, Beijing (CN); Xiaobo Huang, Beijing (CN); Weifeng Huang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/071,395

(22) Filed: Nov. 29, 2022

(65) Prior Publication Data
US 2023/0229705 A1 Jul. 20, 2023

(30) Foreign Application Priority Data
Jan. 20, 2022 (CN) .......................... 202210067041.7

(51) Int. Cl.
*G06F 16/901* (2019.01)
*G06F 40/211* (2020.01)

(52) U.S. Cl.
CPC ........ *G06F 16/9027* (2019.01); *G06F 40/211* (2020.01)

(58) Field of Classification Search
CPC .... G06F 16/9027; G06F 40/211; G06F 40/30; G06F 40/205; G06F 40/279; G06F 16/3329; G06F 16/243; G06F 16/322; G06F 16/36; G06F 40/242; G06F 40/295; G06F 16/9024; G06F 40/117; G06F 40/151;

(Continued)

(56) References Cited

U.S. PATENT DOCUMENTS

| | | | |
|---|---|---|---|
| 6,236,410 B1* | 5/2001 | Politis ................. | G06F 9/45508 345/440 |
| 2006/0062468 A1* | 3/2006 | Xu ..................... | G06V 30/1423 382/186 |

(Continued)

FOREIGN PATENT DOCUMENTS

| | | |
|---|---|---|
| CN | 111563178 A | 8/2020 |
| CN | 112783786 A | 5/2021 |

OTHER PUBLICATIONS

International Search Report in PCT/CN2023/071873, mailed Mar. 23, 2023, 3 pages.

*Primary Examiner* — Evan Aspinwall
(74) *Attorney, Agent, or Firm* — Astute IP Law Group

(57) ABSTRACT

Provided are a graph generation method and apparatus, a device, and a storage medium. The graph generation method comprises: parsing target logical information to obtain a plurality of logical elements; converting the plurality of logical elements into a syntax tree according to logic of the target logical information, where the syntax tree comprises a plurality of layers of tree nodes, and tree nodes between layers have a dependency relationship; converting the plurality of layers of tree nodes into a plurality of graph nodes; and connecting the plurality of graph nodes according to the dependency relationship to obtain a logical graph corresponding to the target logical information to allow a user to perform special effect editing based on the logic.

19 Claims, 8 Drawing Sheets

(58) Field of Classification Search
CPC ...... G06F 8/427; G06F 40/221; G06F 40/284; G06F 16/282; G06F 8/42; G06F 8/443
USPC ................................................ 707/797, 780
See application file for complete search history.

(56) References Cited

U.S. PATENT DOCUMENTS

| | | | |
|---|---|---|---|
| 2006/0062470 A1* | 3/2006 | Zhu .................... | G06V 30/1423 382/186 |
| 2011/0252040 A1 | 10/2011 | Li et al. | |
| 2014/0359585 A1* | 12/2014 | Marvie .................... | G06F 8/44 717/139 |
| 2016/0012033 A1* | 1/2016 | Craymer, III ......... | G06F 40/211 704/9 |
| 2018/0088937 A1* | 3/2018 | Tamir ...................... | G06F 8/433 |
| 2021/0019309 A1* | 1/2021 | Yadav ................. | G06F 16/2428 |
| 2022/0138185 A1* | 5/2022 | Tran ........................ | G06F 40/56 706/18 |
| 2022/0317978 A1* | 10/2022 | Barik ........................ | G06F 8/20 |
| 2022/0317979 A1* | 10/2022 | Araujo Soares .......... | G06F 8/33 |

* cited by examiner 1  1  <-- Current node pointer

```
1      +
2   1    a   <-- Current node pointer
```

FIG. 2B

```
1      +     <-- Current node pointer
2   1
```

FIG. 3

```
1   1   <-- Current node pointer
```

FIG. 4A

```
1    -   <-- Current node pointer
2   1
```

FIG. 4B

```
1    -
2    1    2    <-- Current node pointer
```

FIG. 4C

```
1    +        <-- Current node pointer
2    -
3    1    2
```

FIG. 4D

```
1    +
2    -    3   <-- Current node pointer
3    1    2
```

FIG. 4E

```
1    +   <--    Current node pointer
2    +
3    -    3
4    1    2
```

FIG. 4F

```
1      +
2      +      4    <-- Current node pointer
3      -      3
4      1      2
```

FIG. 4G

```
1      +
2      +             *    <-- Current node pointer
3      -      3      4
4      1      2
```

FIG. 4H

```
1      +
2      +             *
3      -      3      4    5    <-- Current node pointer
4      1      2
```

FIG. 4I

```
1      +
2      +             *
3      -      3      4    /    <-- Current node pointer
4      1      2             5
```

FIG. 4J

```
1     +
2     +      *
3     −   3  4  /
4  1  2        5  6   <-- Current node pointer
```

FIG. 4K

```
1  2  <-- Current node pointer
```

FIG. 5A

```
1     −  <-- Current node pointer
2  2
```

FIG. 5B

```
1
2        abs
3        −
4     a   b   <-- Current node pointer
```

FIG. 5C

```
1      -
2   2  abs   <-- Current node pointer
3      -
4      a  b
```

```
1         +
2      -       3  <-- Current node pointer
3   2  abs
4      -
5      a  b
```

GRAPH GENERATION METHOD AND APPARATUS, DEVICE, AND STORAGE MEDIUM

This application claims priority to the Chinese patent application No. 202210067041.7 filed on Jan. 20, 2022, the content of which is incorporated herein by reference in its entirety.

TECHNICAL FIELD

Embodiments of the present disclosure relate to the field of computer technologies, for example, to a graph generation method and apparatus, a device, and a storage medium.

BACKGROUND

In the graphical programming (Graph for short) process, some logical information (for example, mathematical expressions) is required to be edited to implement functions such as numerical calculation and motion trajectory calculation. At present, the function of the mathematical operation module provided by graphical programming is relatively single, causing the complex user configuration and the low configuration efficiency.

SUMMARY

Embodiments of the present disclosure provide a graph generation method and apparatus, a device, and a storage medium, to convert logical information into a logical graph so that a user configures computational logic through the logical graph, thereby improving the configuration efficiency.

In a first aspect, an embodiment of the present disclosure provides a graph generation method. The method includes the steps described below.

Target logical information is parsed to obtain multiple logical elements.

The multiple logical elements are converted into a syntax tree according to the logic of the target logical information, where the syntax tree includes multiple layers of tree nodes, and tree nodes between layers have a dependency relationship.

The multiple layers of tree nodes are converted into multiple graph nodes.

The multiple graph nodes are connected according to the dependency relationship to obtain a logical graph corresponding to the target logical information to allow a user to perform special effect editing based on the logic.

In a second aspect, an embodiment of the present disclosure further provides a graph generation apparatus. The apparatus includes a logical element acquisition module, a syntax tree acquisition module, a graph node conversion module, and a logical graph acquisition module.

The logical element acquisition module is configured to parse target logical information to obtain multiple logical elements.

The syntax tree acquisition module is configured to convert the multiple logical elements into a syntax tree according to the logic of the target logical information, where the syntax tree includes multiple layers of tree nodes, and tree nodes between layers have a dependency relationship.

The graph node conversion module is configured to convert the multiple layers of tree nodes into multiple graph nodes.

The logical graph acquisition module is configured to connect the multiple graph nodes according to the dependency relationship to obtain a logical graph corresponding to the target logical information to allow a user to perform special effect editing based on the logic.

In a third aspect, an embodiment of the present disclosure further provides an electronic device. The electronic device includes one or more processing apparatuses and a storage apparatus which is configured to store one or more programs. The one or more programs, when executed by the one or more processing apparatuses, cause the one or more processing apparatuses to perform the graph generation method described in embodiments of the present disclosure.

In a fourth aspect, an embodiment of the present disclosure further provides a computer-readable medium storing a computer program, where the program, when executed by a processing apparatus, performs the graph generation method described in embodiments of the present disclosure.

The embodiments of the present disclosure provide a graph generation method and apparatus, a device, and a storage medium. Target logical information is parsed to obtain multiple logical elements; the multiple logical elements are converted into a syntax tree according to the logic of the target logical information, where the syntax tree includes multiple layers of tree nodes, and tree nodes between layers have a dependency relationship; the multiple layers of tree nodes are converted into multiple graph nodes; and the multiple graph nodes are connected according to the dependency relationship to obtain a logical graph corresponding to the target logical information to allow a user to perform special effect editing based on the logic. According to the graph generation method provided in the embodiments of the present disclosure, logical information may be converted into a logical graph so that a user configures computational logic through the logical graph to achieve the editing of audio special effects and image special effects, thereby improving the configuration efficiency.

BRIEF DESCRIPTION OF DRAWINGS

FIG. 2B is an example diagram of insertion or transformation performed on a tree using a read logical element as a tree node according to an embodiment of the present disclosure;

FIG. 3 is an example diagram of insertion or transformation performed on a tree using a read logical element as a tree node according to an embodiment of the present disclosure;

FIG. 4A is an example diagram of insertion or transformation performed on a tree using a read logical element as a tree node according to an embodiment of the present disclosure;

FIG. 4B is an example diagram of insertion or transformation performed on a tree using a read logical element as a tree node according to an embodiment of the present disclosure;

FIG. 4C is an example diagram of insertion or transformation performed on a tree using a read logical element as a tree node according to an embodiment of the present disclosure;

FIG. 4D is an example diagram of insertion or transformation performed on a tree using a read logical element as a tree node according to an embodiment of the present disclosure;

FIG. 4E is an example diagram of insertion or transformation performed on a tree using a read logical element as a tree node according to an embodiment of the present disclosure;

FIG. 4F is an example diagram of insertion or transformation performed on a tree using a read logical element as a tree node according to an embodiment of the present disclosure;

FIG. 4G is an example diagram of insertion or transformation performed on a tree using a read logical element as a tree node according to an embodiment of the present disclosure;

FIG. 4H is an example diagram of insertion or transformation performed on a tree using a read logical element as a tree node according to an embodiment of the present disclosure;

FIG. 4I is an example diagram of insertion or transformation performed on a tree using a read logical element as a tree node according to an embodiment of the present disclosure;

FIG. 4J is an example diagram of insertion or transformation performed on a tree using a read logical element as a tree node according to an embodiment of the present disclosure;

FIG. 4K is an example diagram of insertion or transformation performed on a tree using a read logical element as a tree node according to an embodiment of the present disclosure;

FIG. 5A is an example diagram of insertion or transformation performed on a tree using a read logical element as a tree node according to an embodiment of the present disclosure;

FIG. 5B is an example diagram of insertion or transformation performed on a tree using a read logical element as a tree node according to an embodiment of the present disclosure;

FIG. 5C is an example diagram of insertion or transformation performed on a tree using a read logical element as a tree node according to an embodiment of the present disclosure;

DETAILED DESCRIPTION

Figures 1, 2A:
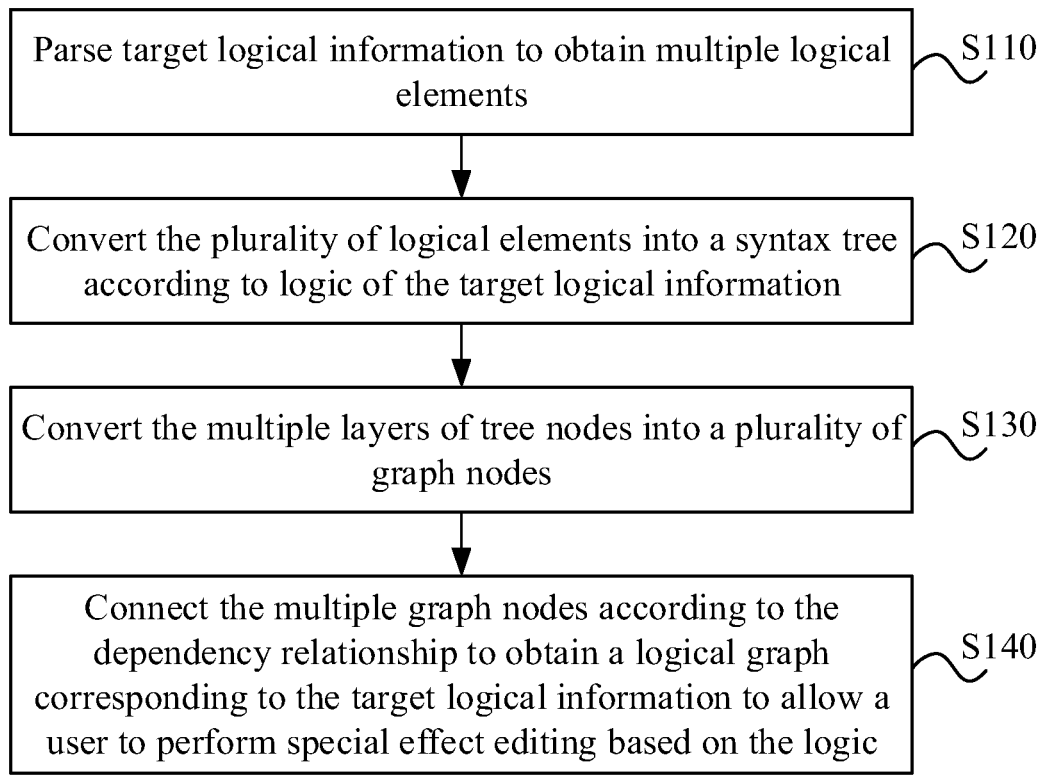
FIG. 1 is a flowchart of a graph generation method according to an embodiment of the present disclosure.
FIG. 2A is an example diagram of insertion or transformation performed on a tree using a read logical element as a tree node according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein. Rather, these embodiments are provided so that the present disclosure will be thoroughly and completely understood. It is to be understood that drawings and embodiments of the present disclosure are illustrative and are not intended to limit the scope of the present disclosure.

It is to be understood that various steps recited in the method embodiments of the present disclosure may be performed in a different order and/or in parallel. In addition, the method embodiments may include additional steps and/or omit the execution of illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are intended to distinguish one apparatus, module or unit from another and are not intended to limit the order or interrelationship of the functions performed by the apparatus, module, or unit.

It is to be noted that references to modifications of "one" or "a plurality" mentioned in the present disclosure are intended to be illustrative and not limiting and that those skilled in the art should understand that "one" or "a plurality" should be understood as "one or more" unless clearly expressed in the context.

The names of messages or information exchanged between multiple apparatuses in the embodiments of the present disclosure are for illustrative purposes and are not intended to limit the scope of such messages or information.

FIG. 1 is a flowchart of a graph generation method according to an embodiment of the present disclosure. This embodiment is applicable to the case where logical information is converted into a logical graph. The method may be executed by a graph generation method. The apparatus may be composed of hardware and/or software and generally integrated into a device having a graph generation function. The device may be a server, a mobile terminal, a server cluster or other electronic devices.

A formula graphic interface provided in this embodiment may parse logical information edited by a user to generate a logical graph, the logical graph includes graph nodes corresponding to various logical elements, and the graph nodes are connected according to the logic to form numerical calculation logic.

An edit box in which the user can input logical information exists at the formula graphic interface, and the edit box provides a formula input port and a formula output port. The use inputs logical elements through the input port to edit a formula, and the output port outputs a calculation result of the formula. The edit box supports the input of functions, numerical values, variables, mathematical operators, logical operators, and the like. When the formula graphic interface is developed, mathematical atomic nodes supported by the formula graphic interface are required to be registered, such as cosine calculation (Cos), absolute value calculation (Abs), square root calculation (Sqrt), and the like. The mathematical atomic node only has an atomized mathematical calculation function, can perform some function processing on numerical values, and does not have a compound calculation function.

As shown in FIG. 1, the method includes steps S110, S120, S130, and S140 described below.

In step S110, target logical information is parsed to obtain multiple logical elements.

The logical information may be a logical expression such as a mathematical formula. The logical element may include a numerical value, a variable, an operator or a multi-level nested expression. The multi-level nested expression consists of multiple levels of sub-expressions, and the sub-expression includes a start character and an end character. The start character may be the left bracket (for example, a round bracket, a square bracket, or a curly bracket), and the end character may be the right bracket. The operator may include a prefix operator, an infix operator, and a postfix operator. The prefix operator may be understood as an operator which is located in front of a variable or a numerical value, for example, a minus sign. The infix operator may be understood as an operator which is located in the middle of variables or numerical values, for example, an addition operator, a subtraction operator, a multiplication operator, or a division operator. The postfix operator may be understood as an operator which is located behind a variable or a numerical value, for example, a percent sign (%). In this embodiment, the target logical information may be parsed into multiple logical elements using a regular expression.

In step S120, the multiple logical elements are converted into a syntax tree according to logic of the target logical information.

The syntax tree includes multiple layers of tree nodes, and tree nodes between layers have a dependency relationship. The dependency relationship may be understood as the relationship between parent nodes and child nodes, and the syntax tree may be an unbalanced ordinary multiway tree including root nodes, intermediate nodes, and leaf nodes.

In this embodiment, the process in which the multiple logical elements are converted into a syntax tree according to logic of the target logical information may be as follows: the multiple logical elements are sequentially read according to an editing order of the target logical information, and insertion or transformation is performed on a tree using a read logical element as a tree node according to a set rule to obtain the syntax tree.

The editing order may be the order from left to right or the order from top to bottom. The set rule may be a rule in which logical elements are inserted into the syntax tree according to the types of the logical elements.

In an embodiment, insertion or transformation may be performed on the tree using the read logical element as the tree node according to the set rule in the following manner: when a read current logical element is any of the following types: a numerical value, a variable, an operator or a prefix operator, if the current logical element is a vertex element, the current logical element is inserted into the tree as a root node, and if the current logical element is a non-vertex element, the current logical element is inserted into the tree as a child node of a neighboring operator of the current logical element.

The vertex element may be the first logical element in a formula. The numerical value may be a specific numerical value, for example, 1. The variable may be understood as an indeterminate quantity represented by a letter, for example, the letter a. The prefix operator may be understood as an operator located in front of a variable or a numerical value. For example, FIGS. 2A and 2B are example diagrams of insertion or transformation performed on a tree using a read logical element as a tree node in this embodiment. Assuming that the logical information is "1+a", and "1" is the first logical element of the formula. As shown in FIG. 2A, when "1" is read, "1" is directly inserted into the tree as a root node. As shown in FIG. 2B, when "a" is read, "a" is inserted into the tree as the child node of "+" because "a" is a non-vertex element.

In an embodiment, insertion or transformation may be performed on the tree using the read logical element as the tree node according to the set rule in the following manner: when the read current logical element is an infix operator or a postfix operator, if a forward neighboring logical element of the current logical element is a vertex element, the current logical element is inserted into the tree as a new root node, and the forward neighboring logical element is transformed into a child node of the new root node.

The process in which the current logical element is inserted into the tree as the new root node and the forward neighboring logical element is transformed into the child node of the new root node may be as follows: the current logical element is first inserted into the tree as the child node of the forward neighboring logical element of the current logical element, and the locations of the current logical element and the forward neighboring logical element of the current logical element are interchanged. For example, FIG. 3 is an example diagram of insertion or transformation performed on a tree using a read logical element as a tree node in this embodiment. As shown in FIG. 3, assuming that the logical information is "1+a", when "+" is read, "+" is taken as a new root node because the forward neighboring logical element "1" of "+" is a vertex element, and "1" is transformed into the child node of "+".

In an embodiment, insertion or transformation may be performed on the tree using the read logical element as the tree node according to the set rule in the following manner: when the read current logical element is the infix operator or the postfix operator, if the forward neighboring logical element of the current logical element is a non-vertex element, an operator is searched for upwards in a constructed tree; if an operator whose priority is less than or equal to a priority of the current logical element is found, the current logical element is inserted into the tree as a child node of the found operator, and the forward neighboring logical element of the current logical element is transformed as a child node of the current logical element; and if the operator whose priority is less than or equal to the priority of the current logical element is not found, the current logical element is inserted into the tree as a root node.

The operation of searching upwards for the operator in the constructed tree may be understood as the operation of searching upwards for an operator starting from a current node until the root node. The priority is determined by logic in mathematics. Taking the formula 1−2+3+4*5/6 as an example, FIGS. 4A to 4K are example diagrams of generated logical graphs corresponding to the formula. As shown in FIG. 4A, when "1" is read, "1" is inserted into the tree as a root node. As shown in FIG. 4B, when "−" is read, "−" is taken as a new root node, and "1" is transformed into the child node of "−". As shown in FIG. 4C, when "2" is read, "2" is directly taken as the child node of "−". As shown in FIG. 4D, when "+" is read and no operator whose priority is less than or equal to the priority of "+" is found upwards, "+" is taken as a new root node. As shown in FIG. 4E, when "3" is read, "3" is inserted into the tree as the child node of "+". As shown in FIG. 4F, when "+" is read and no operator whose priority is less than or equal to the priority of "+" is found upwards, "+" is taken as a new root node. As shown in FIG. 4G, when "4" is read, "4" is directly taken as the child node of "+" which is the neighboring node of "4". As shown in FIG. 4H, when "*" is read and "+" which serves as the root node and whose priority is less than the priority of "*" is found upwards, "*" is inserted into the tree as the child node of "+", and "4" is transformed as the child node of "*". As shown in FIG. 4I, when "5" is read, "5" is directly inserted into the tree as the child node of "*". As shown in FIG. 4J, when "/" is read and "*" whose priority is equal to the priority of "/" is found upwards, "/" is inserted into the tree as the child node of "*", and "5" is transformed as the child node of "/". As shown in FIG. 4K, when "6" is read, "6" is inserted into the tree as the child node of "/".

In an embodiment, insertion or transformation may be performed on the tree using the read logical element as the tree node according to the set rule in the following manner: if the read current logical element is a multi-level nested expression, for a sub-expression on each level in the multi-level nested expression, a logical element in the sub-expression is read from the start character, insertion or transformation is performed on the tree using the logical element in the sub-expression according to the set rule to obtain a sub-tree, and the sub-tree is taken as a child node of a neighboring operator of the sub-expression; and when the end character is read, the reading of the sub-expression is completed, and a parent node of the start character is rolled back to to continue to perform insertion and transformation on the tree until insertion or transformation of the tree for the multi-level nested expression is completed.

The multi-level nested expression may be understood as an expression including at least one level of sub-expression, where the sub-expression is surrounded by a bracket and, for example, may be a function expression. The operation in which the parent node of the start character is rolled back to may be understood as the operation in which the parent node of the start character is taken as the current node. In this embodiment, for each sub-expression, if the start character is read, such as "(", the logical element following the start character continues to be read, and insertion and transformation are performed on the tree using the read logical element according to the preceding rule; and if the end character is read, such as ")", the parent node of the corresponding start character is rolled back to to continue to perform insertion and transformation on the tree.

Figures 5D, 5E, 6:
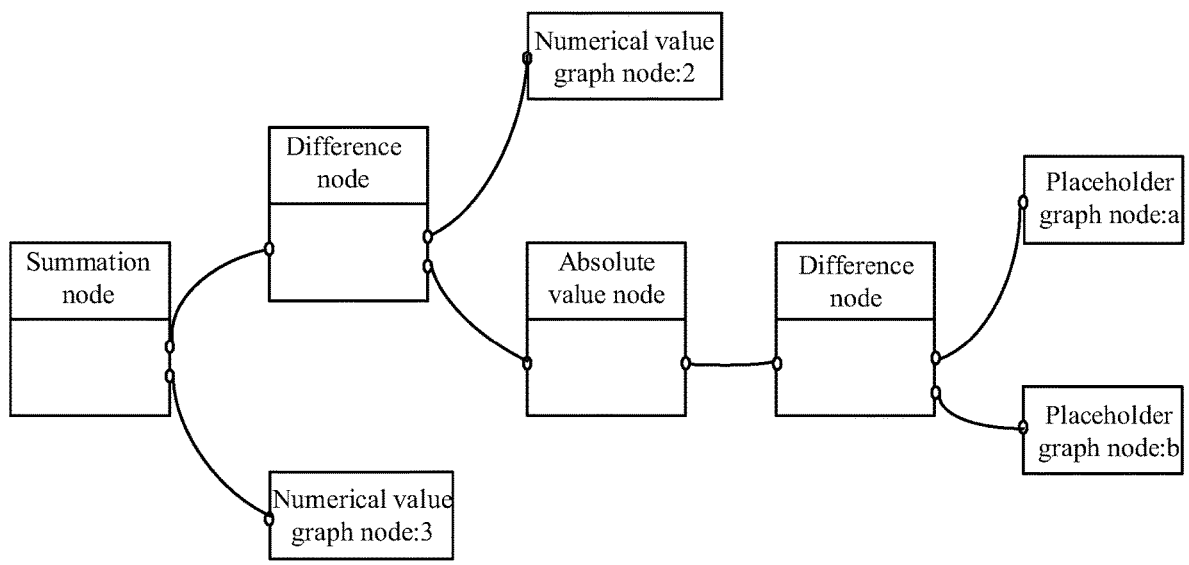
FIG. 5D is an example diagram of insertion or transformation performed on a tree using a read logical element as a tree node according to an embodiment of the present disclosure.
FIG. 5E is an example diagram of insertion or transformation performed on a tree using a read logical element as a tree node according to an embodiment of the present disclosure.
FIG. 6 is an example diagram of a generated logical graph according to an embodiment of the present disclosure.

Taking the formula 2−abs(a−b)+3 as an example, FIGS. 5A to 5E are example diagrams of generated logical graphs corresponding to the formula. As shown in FIG. 5A, when "2" is read, "2" is inserted into the tree as a root node. As shown in FIG. 5B, when "−" is read, "−" is taken as a new root node, and "2" is transformed into the child node of "−". As shown in FIG. 5C, when "abs" is read, the sub-tree corresponding to "abs" is generated. As shown in FIG. 5D, the sub-tree corresponding to "abs" is taken as the child node of "=", and the node where "abs" is located is rolled back to. As shown in FIG. 5E, when "+" and "3" are read sequentially, "+" and "3" are inserted into the tree according to the preceding rule.

In step S130, the multiple layers of tree nodes are converted into multiple graph nodes.

Different types of logical elements are converted into different types of graphic nodes. In this embodiment, level-order traversal is performed on the syntax tree from the root node, the obtained tree nodes on each level are stored in a two-dimensional array, and tree nodes on each level are converted into graph nodes. The graph nodes are connected according to the dependency relationship (parent-child relationship) between the tree nodes to obtain a logical graph. One dimension in the two-dimensional array stores level sequence numbers, and the other stores the tree nodes included on each level.

In an embodiment, the process in which the multiple layers of tree nodes are converted into multiple graph nodes may be as follows: level traversal is performed on the syntax tree, and if a traversed tree node is an operator or a function, the tree node is converted into an operation graph node; if the traversed tree node is a numerical value, the tree node is converted into a numerical value graph node; and if the traversed tree node is a variable, the tree node is converted into a placeholder graph node.

The operator may be a sign of logic such as addition, subtraction, multiplication and division, and the function may be, for example, abs, cos or other functions. The numerical value graph node and the placeholder graph node may be used as the input of the operation graph node.

Optionally, for the numerical value, the numerical value may be directly mapped as the input data of its parent node so that no more numerical value graph node needs to be generated, thereby saving system resources.

In step S140, the multiple graph nodes are connected according to the dependency relationship to obtain a logical graph corresponding to the target logical information to allow a user to perform special effect editing based on the logic.

The dependency relationships may be understood as the parent-child relationship in the syntax tree.

The step in which the multiple graph nodes are connected according to the dependency relationship includes the following.

In an embodiment, the multiple graph nodes may be connected according to the dependency relationship in the following manner: an output port of a graph node corresponding to a child node in the syntax tree is connected to an input port of a graph node corresponding to a parent node of the child node. That is, in this embodiment, the graph node into which the child node is converted in the syntax tree is used as the input of the graph node into which the parent node of the child node is converted.

In this embodiment, the process in which the output port of the graph node corresponding to the child node in the syntax tree is connected to the input port of the graph node corresponding to the parent node of the child node may be as follows: an output port of the numerical value graph node or an output port of the placeholder graph node is connected to an input port of an operation graph node corresponding to a parent node of the numerical value graph node or a parent node of the placeholder graph node, and an output port of an operation graph node of a non-root node is connected to an input port of an operation graph node corresponding to a parent node of the non-root node.

For example, FIG. 6 is an example diagram of a generated logical graph in this embodiment. As shown in FIG. 6, taking the formula 2−abs(a−b)+3 as an example, the syntax tree generated by the formula is transformed from the root node into graph nodes. "+" is converted into a "summation node", "−" is converted into a "difference node", "3" is converted into a numerical value graph node, "2" is converted into a numerical value graph node, "abs" is converted into an "absolute value node", "−" is converted into a "difference node", and "a" and "b" are converted into placeholder graph nodes sequentially. The output ports of the placeholder graph nodes respectively corresponding to "a" and "b" are connected to the input port of the "difference node" on the upper level. The output port of the "difference node" and the output port of the numerical value graph node corresponding to "2" are connected to the input port of the "difference node" on the upper level. The output port of the "difference node" and the output port of the numerical value graph node corresponding to "3" are connected to the output port of the "summation node". In this manner, the logical graph is generated.

In an embodiment, after the target logical information is parsed to obtain multiple logical elements, the method further includes the following steps: if the target logical information includes a multi-level nested expression, a set stack is generated; logical elements included in the multi-level nested expression are sequentially pushed onto the set stack from a start character, when an end character is pushed, logical elements in the set stack are sequentially popped until a start character matching the end character is popped, and a sub-expression is generated according to the popped logical elements; if the parsing of the multi-level nested expression is not completed, remaining logical elements are sequentially pushed onto the set stack, when the end character is pushed, logical elements in the set stack are sequentially popped until a start character matching the end character is popped, and a sub-expression is generated according to the popped logical elements; and if the parsing of the multi-level nested expression is completed, whether a logical element exists in the set stack is determined, and if a logical element exists in the set stack, an error alert is issued.

Figure 7:
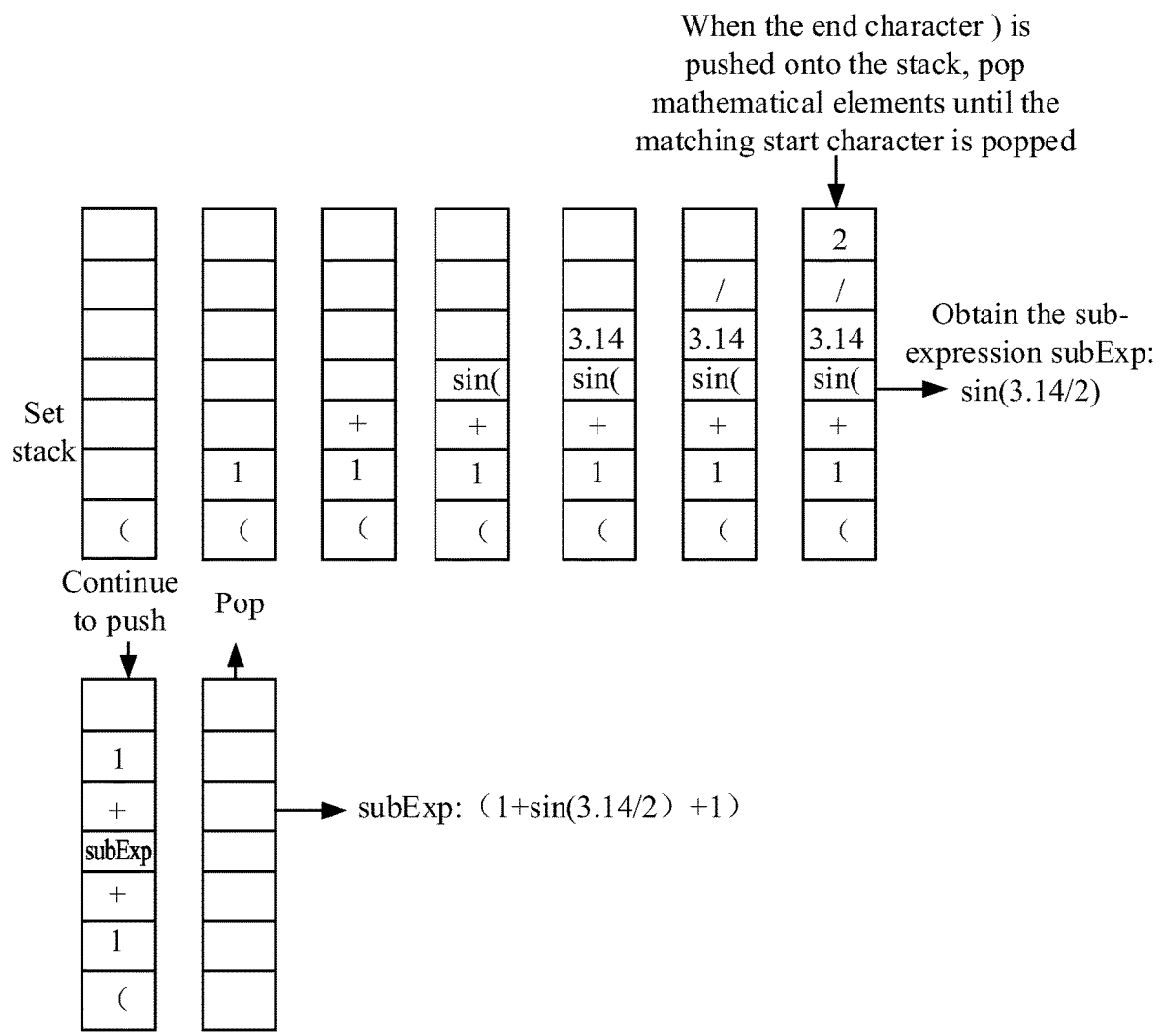
FIG. 7 is an example diagram of parsing a multi-level nested expression according to an embodiment of the present disclosure.

In this embodiment, when the parsing proceeds to the end character, it indicates that the parsing of the sub-expression is completed. At this point, the logical elements in the set stack are popped until the matched start character is popped, and the sub-expression is generated by the logical elements between the popped start character and the end character. For example, FIG. 7 is an example diagram of parsing a multi-level nested expression in this embodiment. As shown in FIG. 7, taking the formula 3*(1+sin(3.14/2)+1) as an example, for the multi-level nested expression (1+sin(3.14/2)+1), when the end character behind 2 is pushed onto the stack, the logical elements in the set stack are popped until sin(is popped, the sub-expression sin (3.14/2) is generated according to the popped logical elements, and the push operation continues from sin(3.14/2) until the parsing of the multi-level nested expression is completed.

In this embodiment, after the logical graph corresponding to the target logical information is obtained, the logical graph is combined with other special effect nodes to achieve the editing of image special effects or audio special effects. For example, assuming that when an image deformation special effect packet is generated, the deformation parameter of the image needs to be calculated, the logical graph corresponding to the deformation formula may be called for calculation, and the calculation result of the logical graph is input to the deformation special effect node to generate the image deformation special effect. For example, when the special effect editing needs to be performed on audio, the logic is that the average value of the volumes of the two segments of audio is used as the volume of the third segment of audio, and at this point, the logical graph corresponding to the formula (a+b)/2 is required to be called for processing.

In the technical schemes of the embodiments of the present disclosure, target logical information is parsed to obtain multiple logical elements; the multiple logical elements are converted into a syntax tree according to the logic of the target logical information, where the syntax tree includes multiple layers of tree nodes, and tree nodes between layers have a dependency relationship; the multiple layers of tree nodes are converted into multiple graph nodes; and the multiple graph nodes are connected according to the dependency relationship to obtain a logical graph corresponding to the target logical information to allow the user to perform special effect editing based on the logic. According to the graph generation method provided in the embodiments of the present disclosure, logical information can be converted into a logical graph so that the user configures computational logic through the logical graph to achieve the editing of audio special effects and image special effects, thereby improving the configuration efficiency.

Figure 8:
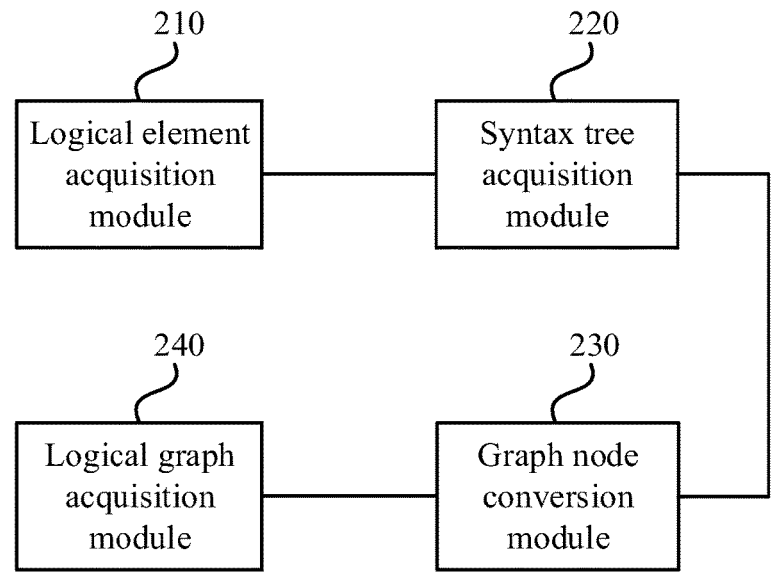
FIG. 8 is a structure diagram of a graph generation apparatus according to an embodiment of the present disclosure.

FIG. 8 is a structure diagram of a graph generation apparatus according to an embodiment of the present disclosure. As shown in FIG. 8, the apparatus includes a logical element acquisition module 210, a syntax tree acquisition module 220, a graph node conversion module 230, and a logical graph acquisition module 240.

The logical element acquisition module 210 is configured to parse target logical information to obtain multiple logical elements.

The syntax tree acquisition module 220 is configured to convert the multiple logical elements into a syntax tree according to the logic of the target logical information, where the syntax tree includes multiple layers of tree nodes, and tree nodes between layers have a dependency relationship.

The graph node conversion module 230 is configured to convert the multiple layers of tree nodes into multiple graph nodes.

The logical graph acquisition module 240 is configured to connect the multiple graph nodes according to the dependency relationship to obtain a logical graph corresponding to the target logical information to allow a user to perform special effect editing based on the logic.

Optionally, the logical element includes a numerical value, a variable, an operator or a multi-level nested expression, where the multi-level nested expression consists of multiple levels of sub-expressions, and each sub-expression includes a start character and an end character.

Optionally, the syntax tree acquisition module 220 is further configured to: sequentially read the multiple logical elements according to an editing order of the target logical information; and perform insertion or transformation on a tree using a read logical element as a tree node according to a set rule to obtain the syntax tree.

Optionally, the syntax tree acquisition module 220 is further configured to: when a read current logical element is any of the following types: a numerical value, a variable, an operator or a multi-level nested expression, if the current logical element is a vertex element, insert the current logical element into the tree as a root node; and if the current logical element is a non-vertex element, insert the current logical element into the tree as a child node of a neighboring operator of the current logical element.

Optionally, the syntax tree acquisition module 220 is further configured to: when the read current logical element is an infix operator or a postfix operator, if a forward neighboring logical element of the current logical element is a vertex element, insert the current logical element into the tree as a new root node, and transform the forward neighboring logical element into a child node of the new root node.

Optionally, the syntax tree acquisition module 220 is further configured to: when the read current logical element is the infix operator or the postfix operator, if the forward neighboring logical element of the current logical element is a non-vertex element, search for upward an operator in a constructed tree; if an operator whose priority is less than or equal to a priority of the current logical element is found, insert the current logical element into the tree as a child node of the found operator, and transform the forward neighboring logical element of the current logical element as a child node of the current logical element; and if the operator whose priority is less than or equal to the priority of the current logical element is not found, insert the current logical element into the tree as a root node.

Optionally, the syntax tree acquisition module 220 is further configured to: if the read current logical element is a multi-level nested expression, for a sub-expression on each level in the multi-level nested expression, read a logical element in the sub-expression from the start character, perform insertion or transformation on the tree using the logical element in the sub-expression according to the set rule to obtain a sub-tree, and use the sub-tree as a child node of a neighboring operator of the sub-expression; and when the end character is read, complete reading the sub-expression, and roll back to a parent node of the start character to continue to perform insertion and transformation on the tree until insertion or tree transformation performed on the tree for the multi-level nested expression is completed.

Optionally, the graph node conversion module 230 is further configured to: perform level traversal on the syntax tree, and if a traversed tree node is an operator or a function, convert the tree node into an operation graph node; if the traversed tree node is a numerical value, convert the tree node into a numerical value graph node; and if the traversed tree node is a variable, convert the tree node into a placeholder graph node.

Optionally, the logical graph acquisition module 240 is further configured to: connect an output port of a graph node corresponding to a child node in the syntax tree to an input port of a graph node corresponding to a parent node of the child node.

Optionally, the logical graph acquisition module 240 is further configured to: connect an output port of the numerical value graph node or an output port of the placeholder graph node to an input port of an operation graph node corresponding to a parent node of the numerical value graph node or the placeholder graph node; and connect an output port of an operation graph node of a non-root node to an input port of an operation graph node corresponding to a parent node of the non-root node.

Optionally, the apparatus further includes a multi-level nested expression parsing module. The multi-level nested expression parsing module is configured to, if the target logical information includes a multi-level nested expression, generate a set stack; sequentially push logical elements included in the multi-level nested expression onto the set stack from a start character, when an end character is pushed, sequentially pop logical elements in the set stack until a start character matching the end character is popped, and generate a sub-expression according to the popped logical elements; if the parsing of the multi-level nested expression is not completed, sequentially push remaining logical elements onto the set stack, when the end character is pushed, sequentially pop logical elements in the set stack until a start character matching the end character is popped, and generate a sub-expression according to the popped logical elements; and if the parsing of the multi-level nested expression is completed, determine whether a logical element exists in the set stack, and if a logical element exists in the set stack, issue an error alert.

The preceding apparatus can execute the methods provided in all embodiments of the present disclosure and has functional modules and beneficial effects corresponding to the executed methods. For technical details not described in detail in this embodiment, reference may be made to the methods provided in all embodiments of the present disclosure.

Figure 9:
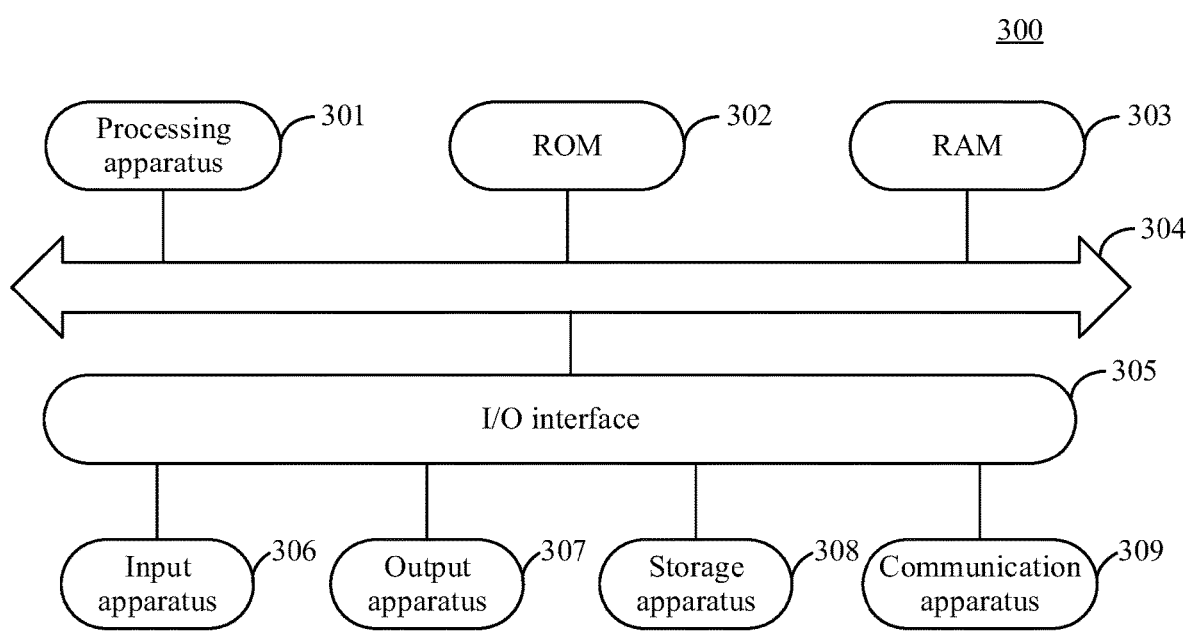
FIG. 9 is a structure diagram of an electronic device according to an embodiment of the present disclosure.

With reference to FIG. 9, FIG. 9 shows a structure diagram of an electronic device 300 suitable for implementing the embodiments of the present disclosure. The electronic device in the embodiments of the present disclosure may include, but is not limited to, a mobile terminal such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), a fixed terminal such as a digital television (TV) and a desktop computer, and various forms of servers such as a stand-alone server and a server cluster. The electronic device shown in FIG. 9 is illustrative and is not intended to limit the function and usage scope of the embodiments of the present disclosure.

As shown in FIG. 9, the electronic device 300 may include a processing apparatus 301 (such as a central processing unit and a graphics processing unit) and may perform various types of appropriate operations and processing based on a program stored in a read-only memory (ROM) 302 or a program loaded from a storage apparatus 308 to a random-access memory (RAM) 303. Various programs and data required for the operation of the electronic device 300 are also stored in the RAM 303. The processing apparatus 301, the ROM 302, and the RAM 303 are connected to each other via a bus 304. An input/output (I/O) interface 305 is also connected to the bus 304.

Generally, the following apparatuses may be connected to the I/O interface 305: an input apparatus 306 such as a touch screen, a touchpad, a keyboard, a mouse, a camera, a microphone, an accelerometer and a gyroscope; an output apparatus 307 such as a liquid-crystal display (LCD), a speaker and a vibrator; the storage apparatus 308 such as a magnetic tape and a hard disk; and a communication apparatus 309. The communication apparatus 309 may allow the electronic device 300 to perform wireless or wired communication with other devices to exchange data. Although FIG. 9 shows the electronic device 300 having various apparatuses, it is to be understood that not all of the apparatuses shown herein need to be implemented or present. More or fewer apparatuses may alternatively be implemented or present.

Particularly, according to the embodiments of the present disclosure, the processes described above with reference to the flowcharts may be implemented as computer software programs. For example, an embodiment of the present disclosure includes a computer program product. The computer program product includes a computer program carried in a computer-readable medium, and the computer program includes program codes for performing a graph generation method. In such an embodiment, the computer program may be downloaded from a network and installed through the communication apparatus 309, may be installed from the storage apparatus 308, or may be installed from the ROM 302. When the computer program is executed by the processing apparatus 301, the preceding functions defined in the method provided in the embodiments of the present disclosure are executed.

It is to be noted that the preceding computer-readable medium in the present disclosure may be a computer-readable signal medium, a computer-readable storage medium or any combination thereof The computer-readable storage medium, for example, may be, but is not limited to, an electronic, magnetic, optical, electromagnetic, infrared or semiconductor system, apparatus or device or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM, or a flash memory), an optical fiber, a portable compact disk read-only memory (CD-ROM), an optical memory device, a magnetic memory device, or any appropriate combination thereof. In the present disclosure, the computer-readable storage medium may be any tangible medium that contains or stores a program for use by or in connection with an instruction execution system, apparatus, or device. In the present disclosure, the computer-readable signal medium may include a propagated data signal with computer-readable program code embodied therein, for example, in baseband or as part of a carrier wave. Such a propagated data signal may take any of a variety of forms, including, but not limited to, electro-magnetic, optical, or any suitable combination thereof. The computer-readable signal medium may further be any computer-readable medium that is not a computer-readable storage medium and that can communicate, propagate, or transport a program for use by or in connection with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future-developed network protocol, such as HyperText Transfer Protocol (HTTP) and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any currently known or future-developed network.

The computer-readable medium may be included in the preceding electronic device or may exist alone without being assembled into the electronic device.

The preceding computer-readable medium carries one or more programs that, when executed by the electronic device, cause the electronic device to: parse target logical information to obtain multiple logical elements; convert the multiple logical elements into a syntax tree according to the logic of the target logical information, where the syntax tree includes multiple layers of tree nodes, and tree nodes between layers have a dependency relationship; convert the multiple layers of tree nodes into multiple graph nodes; and connect the multiple graph nodes according to the dependency relationship to obtain a logical graph corresponding to the target logical information to allow the user to perform special effect editing based on the logic.

Computer program codes for performing the operations in the present disclosure may be written in one or more programming languages or combinations thereof. The preceding one or more programming languages include, but are not limited to, object-oriented programming languages such as Java, Smalltalk and C++, and conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any kind of network including a local area network (LAN) or a wide area network (WAN) or may be connected to an external computer (for example, through the Internet using an Internet service provider).

The flowcharts and block diagrams in the drawings illustrate system architectures, functions, and operations possibly implemented by the system, method, and computer program product of various embodiments of the present disclosure. In this regard, each block in the flowcharts or block diagrams may represent a module, a program segment, or part of codes, where the module, program segment, or part of codes may contain one or more executable instructions for implementing a prescribed logic function. It is also to be noted that in some alternative implementations, the functions noted in the blocks may occur out of the order noted in the drawings. For example, two successively expressed blocks may actually be executed substantially in parallel, or the blocks may sometimes be executed in a reverse order, depending on the functionality involved. It is also to be noted that each block in the block diagrams and/or flowcharts and a combination of blocks in the block diagrams and/or flowcharts may be implemented by special-purpose hardware-based systems that perform the specified functions or operations, or combinations of special-purpose hardware and computer instructions.

The units involved in the embodiments of the present disclosure may be implemented in a software manner or in a hardware manner. The name of a unit is not intended to limit the unit in a certain circumstance.

The functions described above herein may be executed, at least in part, by one or more hardware logic components. For example, and without limitations, example types of hardware logic components that may be used include: a field-programmable gate array (FPGA), an application-specific integrated circuit (ASIC), an application-specific standard product (ASSP), system on a chip (SOC), a complex programmable logic device (CPLD), and the like.

In the context of the present disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof More specific examples of the machine-readable storage medium may include an electrical connection based on one or more wires, a portable computer disk, a hard disk, a random-access memory (RAM), a read-only memory (ROM), an erasable programmable read-only memory (EPROM, or a flash memory), an optical fiber, a portable compact disk read-only memory (CD-ROM), an optical memory device, a magnetic memory device, or any appropriate combination thereof.

According to one or more embodiments of the present disclosure, a graph generation method is provided, and the method includes the following steps.

Target logical information is parsed to obtain multiple logical elements.

The multiple logical elements are converted into a syntax tree according to the logic of the target logical information, where the syntax tree includes multiple layers of tree nodes, and tree nodes between layers have a dependency relationship.

The multiple layers of tree nodes are converted into multiple graph nodes.

The multiple graph nodes are connected according to the dependency relationship to obtain a logical graph corresponding to the target logical information to allow the user to perform special effect editing based on the logic.

Further, the logical element includes a numerical value, a variable, an operator or a multi-level nested expression, where the multi-level nested expression consists of multiple levels of sub-expressions, and each sub-expression includes a start character and an end character.

Further, the step in which the multiple logical elements are converted into a syntax tree according to the logic of the target logical information includes the following steps.

The multiple logical elements are sequentially read according to an editing order of the target logical information.

Insertion or transformation is performed on a tree using a read logical element as a tree node according to a set rule to obtain the syntax tree.

Further, the step in which insertion or transformation is performed on the tree using the read logical element as the tree node according to the set rule includes the following steps.

When a read current logical element is any of the following types: a numerical value, a variable, an operator or a multi-level nested expression, if the current logical element is a vertex element, the current logical element is inserted into the tree as a root node; and if the current logical element is a non-vertex element, the current logical element is inserted into the tree as a child node of a neighboring operator of the current logical element.

Further, the step in which insertion or transformation is performed on the tree using the read logical element as the tree node according to the set rule includes the following steps.

When the read current logical element is an infix operator or a postfix operator, if a forward neighboring logical element of the current logical element is a vertex element, the current logical element is inserted into the tree as a new root node, and the forward neighboring logical element is transformed into a child node of the new root node.

Further, the step in which insertion or transformation is performed on the tree using the read logical element as the tree node according to the set rule includes the following steps.

When the read current logical element is the infix operator or the postfix operator, if the forward neighboring logical element of the current logical element is a non-vertex element, an operator is searched for upwards in a constructed tree; if an operator whose priority is less than or equal to a priority of the current logical element is found, the current logical element is inserted into the tree as a child node of the found operator, and the forward neighboring logical element of the current logical element is transformed as a child node of the current logical element; and if the operator whose priority is less than or equal to the priority of the current logical element is not found, the current logical element is inserted into the tree as a root node.

Further, the step in which insertion or transformation is performed on the tree using the read logical element as the tree node according to the set rule includes the following steps.

If the read current logical element is a multi-level nested expression, for a sub-expression on each level in the multi-level nested expression, a logical element in the sub-expression is read from the start character, insertion or transformation is performed on the tree using the logical element in the sub-expression according to the set rule to obtain a sub-tree, and the sub-tree is used as a child node of a neighboring operator of the sub-expression.

When the end character is read, the reading of the sub-expression is completed, and a parent node of the start character is rolled back to to continue perform insertion and transformation on the tree until insertion or transformation performed on the tree for the multi-level nested expression is completed.

Further, the step in which the multiple layers of tree nodes are converted into multiple graph nodes includes the following steps.

Level traversal is performed on the syntax tree, and if a traversed tree node is an operator or a function, the tree node is converted into an operation graph node; if the traversed tree node is a numerical value, the tree node is converted into a numerical value graph node; and if the traversed tree node is a variable, the tree node is converted into a placeholder graph node.

Further, the step in which the multiple graph nodes are connected according to the dependency relationship includes the following step.

An output port of a graph node corresponding to a child node in the syntax tree is connected to an input port of a graph node corresponding to a parent node of the child node.

Further, the step in which the output port of the graph node corresponding to the child node in the syntax tree is connected to the input port of the graph node corresponding to the parent node of the child node includes the following steps.

An output port of the numerical value graph node or an output port of the placeholder graph node is connected to an input port of an operation graph node corresponding to a parent node of the numerical value graph node or a parent node of the placeholder graph node.

An output port of an operation graph node of a non-root node is connected to an input port of an operation graph node corresponding to a parent node of the non-root node.

Further, if the target logical information includes a multi-level nested expression, a set stack is generated.

Logical elements included in the multi-level nested expression are sequentially pushed onto the set stack from a start character, when an end character is pushed, logical elements in the set stack are sequentially popped until a start character matching the end character is popped, and a sub-expression is generated according to the popped logical elements.

If parsing of the multi-level nested expression is not completed, remaining logical elements are sequentially pushed onto the set stack, when the end character is pushed, logical elements in the set stack are sequentially popped until a start character matching the end character is popped, and a sub-expression is generated according to the popped logical elements.

If the parsing of the multi-level nested expression is completed, whether a logical element exists in the set stack is determined, and if a logical element exists in the set stack, an error alert is issued.

It is to be noted that the above are merely preferred embodiments of the present disclosure and the technical principles used therein. It is to be understood by those skilled in the art that the present disclosure is not limited to the embodiments described herein. Those skilled in the art can make various apparent modifications, adaptations and substitutions without departing from the scope of the present disclosure. Therefore, while the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. A graph generation method, applied to an electronic device comprising a processor, wherein the electronic device comprises a server or a terminal, wherein the method comprises:
   parsing target logical information to obtain a plurality of logical elements;
   converting the plurality of logical elements into a syntax tree according to logic of the target logical information, wherein the syntax tree comprises a plurality of layers of tree nodes, and tree nodes between layers have a dependency relationship;
   converting the plurality of layers of tree nodes into a plurality of graph nodes; and
   connecting the plurality of graph nodes according to the dependency relationship to obtain a logical graph corresponding to the target logical information to allow a user to perform special effect editing based on the logic;
   wherein the target logical information comprises a mathematical formula; and
   wherein converting the plurality of layers of tree nodes into the plurality of graph nodes comprises:
   performing level traversal on the syntax tree;
   in a case where a traversed tree node is an operator of the mathematical formula or a function of the mathematical formula, converting the traversed tree node into an operation graph node;
   in a case where the traversed tree node is a numerical value of the mathematical formula, converting the traversed tree node into a numerical value graph node; and
   in a case where the traversed tree node is a variable of the mathematical formula, converting the traversed tree node into a placeholder graph node.

2. The method according to claim 1, wherein the target logical information is a logical expression, and each of the plurality of logical elements comprises the numerical value, the variable, the operator or a multi-level nested expression, wherein the multi-level nested expression consists of a plurality of levels of sub-expressions, and each sub-expression of the plurality of levels of the sub-expressions comprises a start character and an end character.

3. The method according to claim 2, wherein converting the plurality of logical elements into the syntax tree according to the logic of the target logical information comprises:
   sequentially reading the plurality of logical elements according to an editing order of the target logical information; and
   performing insertion or transformation on a tree using a read logical element as a tree node according to a set rule to obtain the syntax tree.

4. The method according to claim 3, wherein performing the insertion or the transformation on the tree using the read logical element as the tree node according to the set rule comprises:
   when a read current logical element is one of following types: the numerical value, the variable, or a prefix operator, and in a case where the current logical element is a vertex element, inserting the current logical element into the tree as a root node; and when a read current logical element is one of following types: the numerical value, the variable, or the prefix operator, and in a case where the current logical element is a non-vertex element, inserting the current logical element into the tree as a child node of a neighboring operator of the current logical element.

5. The method according to claim 3, wherein performing the insertion or the transformation on the tree using the read logical element as the tree node according to the set rule comprises:
   when a read current logical element is an infix operator or a postfix operator, and in a case where a forward neighboring logical element of the current logical element is a vertex element, inserting the current logical element into the tree as a new root node, and transforming the forward neighboring logical element into a child node of the new root node.

6. The method according to claim 5, wherein performing the insertion or the transformation on the tree using the read logical element as the tree node according to the set rule comprises:
   when the read current logical element is the infix operator or the postfix operator, and in a case where the forward neighboring logical element of the current logical element is a non-vertex element, searching upwards for an operator in a constructed tree;
   in a case where an operator whose priority is less than or equal to a priority of the current logical element is found, inserting the current logical element into the tree as a child node of the found operator, and transforming the forward neighboring logical element of the current logical element into a child node of the current logical element; and
   in a case where the operator whose priority is less than or equal to the priority of the current logical element is not found, inserting the current logical element into the tree as a root node.

7. The method according to claim 4, wherein performing the insertion or the transformation on the tree using the read logical element as the tree node according to the set rule comprises:
   in a case where the read current logical element is the multi-level nested expression, for a sub-expression on each level in the multi-level nested expression, reading a logical element in the sub-expression from the start character, performing insertion or transformation on the tree using the logical element in the sub-expression according to the set rule to obtain a sub-tree, and using the sub tree as a child node of a neighboring operator of the sub-expression; and
   when the end character is read, completing reading the sub-expression, and rolling back to a parent node of the start character to continue to perform insertion and transformation on the tree until insertion or transformation performed on the tree for the multi-level nested expression is completed.

8. The method according to claim 5, wherein performing the insertion or the transformation on the tree using the read logical element as the tree node according to the set rule comprises:
   in a case where the read current logical element is the multi-level nested expression, for a sub-expression on each level in the multi-level nested expression, reading a logical element in the sub-expression from the start character, performing insertion or transformation on the tree using the logical element in the sub-expression according to the set rule to obtain a sub-tree, and using the sub-tree as a child node of a neighboring operator of the sub-expression; and when the end character is read, completing reading the sub-expression, and rolling back to a parent node of the start character to continue to perform insertion and transformation on the tree until insertion or transformation performed on the tree for the multi-level nested expression is completed.

9. The method according to claim 6, wherein performing the insertion or the transformation on the tree using the read logical element as the tree node according to the set rule comprises:

in a case where the read current logical element is the multi-level nested expression, for a sub-expression on each level in the multi-level nested expression, reading a logical element in the sub-expression from the start character, performing insertion or transformation on the tree using the logical element in the sub-expression according to the set rule to obtain a sub-tree, and using the sub-tree as a child node of a neighboring operator of the sub-expression; and when the end character is read, completing reading the sub-expression, and rolling back to a parent node of the start character to continue to perform insertion and transformation on the tree until insertion or transformation performed on the tree for the multi-level nested expression is completed.

10. The method according to claim 1, wherein connecting the plurality of graph nodes according to the dependency relationship comprises:

connecting an output port of a graph node corresponding to a child node in the syntax tree to an input port of a graph node corresponding to a parent node of the child node.

11. The method according to claim 10, wherein connecting the output port of the graph node corresponding to the child node in the syntax tree to the input port of the graph node corresponding to the parent node of the child node comprises:

connecting an output port of the numerical value graph node or an output port of the placeholder graph node to an input port of an operation graph node corresponding to a parent node of the numerical value graph node or a parent node of the placeholder graph node; and connecting an output port of an operation graph node of a non-root node to an input port of an operation graph node corresponding to a parent node of the non-root node.

12. The method according to claim 2, further comprising:

in a case where the target logical information comprises the multi-level nested expression, generating a set stack;

sequentially pushing logical elements comprised in the multi-level nested expression onto the set stack from a start character, when an end character is pushed, sequentially popping logical elements in the set stack until a start character matching the end character is popped, and generating a sub-expression according to the popped logical elements;

in a case where parsing of the multi-level nested expression is not completed, sequentially pushing remaining logical elements onto the set stack, when an end character is pushed, sequentially popping logical elements in the set stack until a start character matching the end character is popped, and generating a sub-expression according to the popped logical elements; and in a case where the parsing of the multi-level nested expression is completed, determining whether a logical element exists in the set stack, and in response to determining that a logical element exists in the set stack, issuing an error alert.

13. An electronic device, disposed on a server or a terminal and comprising:

at least one processing apparatus; and a storage apparatus, which is configured to store at least one program;

wherein the at least one program, when executed by the at least one processing apparatus, causes the at least one processing apparatus to perform;

parsing target logical information to obtain a plurality of logical elements;

converting the plurality of logical elements into a syntax tree according to logic of the target logical information, wherein the syntax tree comprises a plurality of layers of tree nodes, and tree nodes between layers have a dependency relationship;

converting the plurality of layers of tree nodes into a plurality of graph nodes; and connecting the plurality of graph nodes according to the dependency relationship to obtain a logical graph corresponding to the target logical information to allow a user to perform special effect editing based on the logic;

wherein the target logical information comprises a mathematical formula; and wherein converting the plurality of layers of tree nodes into the plurality of graph nodes comprises:

performing level traversal on the syntax tree:

in a case where a traversed tree node is an operator of the mathematical formula or a function of the mathematical formula, converting the traversed tree node into an operation graph node;

in a case where the traversed tree node is a numerical value of the mathematical formula, converting the traversed tree node into a numerical value graph node; and in a case where the traversed tree node is a variable of the mathematical formula, converting the traversed tree node into a placeholder graph node.

14. The electronic device according to claim 13, wherein the target logical information is a logical expression, and each of the plurality of logical elements comprises the numerical value, the variable, the operator or a multi-level nested expression, wherein the multi-level nested expression consists of a plurality of levels of sub-expressions, and each sub-expression of the plurality of levels of the sub-expressions comprises a start character and an end character.

15. The electronic device according to claim 14, wherein the at least one program, when executed by the at least one processing apparatus, causes the at least one processing apparatus to perform converting the plurality of logical elements into the syntax tree according to the logic of the target logical information in the following way:

sequentially reading the plurality of logical elements according to an editing order of the target logical information; and performing insertion or transformation on a tree using a read logical element as a tree node according to a set rule to obtain the syntax tree.

16. The electronic device according to claim 15, wherein the at least one program, when executed by the at least one processing apparatus, causes the at least one processing apparatus to perform performing the insertion or the transformation on the tree using the read logical element as the tree node according to the set rule in the following way:

when a read current logical element is one of following types: the numerical value, the variable, or a prefix operator, and in a case where the current logical element is a vertex element, inserting the current logical element into the tree as a root node; and when a read current logical element is one of following types: the numerical value, the variable, or the prefix operator, and in a case where the current logical element is a non-vertex element, inserting the current logical element into the tree as a child node of a neighboring operator of the current logical element.

17. The electronic device according to claim 15, wherein the at least one program, when executed by the at least one processing apparatus, causes the at least one processing apparatus to perform performing the insertion or the transformation on the tree using the read logical element as the tree node according to the set rule in the following way:

when a read current logical element is an infix operator or a postfix operator, and in a case where a forward neighboring logical element of the current logical element is a vertex element, inserting the current logical element into the tree as a new root node, and transforming the forward neighboring logical element into a child node of the new root node.

18. The electronic device according to claim 17, wherein the at least one program, when executed by the at least one processing apparatus, causes the at least one processing apparatus to perform performing the insertion or the transformation on the tree using the read logical element as the tree node according to the set rule in the following way:

when the read current logical element is the infix operator or the postfix operator, and in a case where the forward neighboring logical element of the current logical element is a non-vertex element, searching upwards for an operator in a constructed tree;

in a case where an operator whose priority is less than or equal to a priority of the current logical element is found, inserting the current logical element into the tree as a child node of the found operator, and transforming the forward neighboring logical element of the current logical element into a child node of the current logical element; and in a case where the operator whose priority is less than or equal to the priority of the current logical element is not found, inserting the current logical element into the tree as a root node.

19. A non-transitory computer-readable medium storing a computer program, wherein the computer program, when executed by a processing apparatus disposed on a server or a terminal, performs:

parsing target logical information to obtain a plurality of logical elements;

converting the plurality of logical elements into a syntax tree according to logic of the target logical information, wherein the syntax tree comprises a plurality of layers of tree nodes, and tree nodes between layers have a dependency relationship;

converting the plurality of layers of tree nodes into a plurality of graph nodes; and connecting the plurality of graph nodes according to the dependency relationship to obtain a logical graph corresponding to the target logical information to allow a user to perform special effect editing based on the logic;

wherein the target logical information comprises a mathematical formula; and wherein converting the plurality of layers of tree nodes into the plurality of graph nodes comprises:

performing level traversal on the syntax tree;

in a case where a traversed tree node is an operator of the mathematical formula or a function of the mathematical formula, converting the traversed tree node into an operation graph node:

in a case where the traversed tree node is a numerical value of the mathematical formula, converting the traversed tree node into a numerical value graph node; and in a case where the traversed tree node is a variable of the mathematical formula, converting the traversed tree node into a placeholder graph node.

* * * * *